US012237571B2

(12) United States Patent
Taylor et al.

(10) Patent No.: US 12,237,571 B2
(45) Date of Patent: Feb. 25, 2025

(54) SPACE ANTENNA HAVING EXTENDIBLE HOOP AND INTERCONNECTED CORDS DEFINING POLYGONS AND RELATED METHODS

(71) Applicant: EAGLE TECHNOLOGY, LLC, Melbourne, FL (US)

(72) Inventors: Robert M. Taylor, Rockledge, FL (US); Christopher L. Rose, Palm Bay, FL (US); John Carro, Melbourne, FL (US); Richard I. Harless, Melbourne, FL (US); Miguel Ortega-Morales, Vero Beach, FL (US); Timothy L. Fetterman, Palm Bay, FL (US); David Lopez, Malabar, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 182 days.

(21) Appl. No.: 18/155,797

(22) Filed: Jan. 18, 2023

(65) Prior Publication Data

US 2024/0258685 A1 Aug. 1, 2024

(51) Int. Cl.
*H01Q 1/28* (2006.01)
*H01Q 1/08* (2006.01)
(Continued)

(52) U.S. Cl.
CPC ............... *H01Q 1/288* (2013.01); *H01Q 1/08* (2013.01); *H01Q 1/10* (2013.01); *H01Q 1/1228* (2013.01);
(Continued)

(58) Field of Classification Search
CPC ............ H01Q 1/08; H01Q 1/10; H01Q 1/103; H01Q 1/106; H01Q 1/288; H01Q 1/1228; H01Q 1/1235; H01Q 15/16; H01Q 15/161
See application file for complete search history.

(56) References Cited

U.S. PATENT DOCUMENTS 3,780,375 A 12/1973 Cummings et al.
9,608,333 B1 3/2017 Toledo et al.
(Continued)

OTHER PUBLICATIONS

Sullivan, Marvin R., Harris Corporation; "NASA Contractor Report 3558, Part 1," LSST (Hoop/Column) Maypole Antenna Development Program; Contract NAS1-15763; Jun. 1982; pp. 1-247.
(Continued)

*Primary Examiner* — Robert Karacsony
(74) *Attorney, Agent, or Firm* — ALLEN, DYER, DOPPELT, GILCHRIST, P.A. Attorneys at Law

(57) ABSTRACT

A space antenna may include an extendible boom movable between stored and deployed positions. An extendible hoop may surround the extendible boom and is movable between the stored and deployed positions. A front cord arrangement may be coupled to the extendible hoop and defines a curved shape in the deployed position, and a reflective layer may be carried thereby. A rear cord arrangement may be behind the front cord arrangement and coupled between the extendible hoop and the extendible boom. The rear cord arrangement may include a rear plurality of interconnected cords defining rear polygons. Tie cords may extend between the front cord arrangement and the rear cord arrangement. A top cord arrangement may be above the reflective layer and coupled between the hoop and the extendible boom.

31 Claims, 5 Drawing Sheets

(51) Int. Cl.
*H01Q 1/10* (2006.01)
*H01Q 1/12* (2006.01)
*H01Q 15/16* (2006.01)

(52) U.S. Cl.
CPC ......... *H01Q 1/1235* (2013.01); *H01Q 15/161* (2013.01)

(56) References Cited

U.S. PATENT DOCUMENTS

| | | | |
|---|---|---|---|
| 10,418,712 | B1 | 9/2019 | Henderson et al. |
| 11,283,183 | B2 | 3/2022 | Henderson et al. |
| 2022/0037795 | A1 | 2/2022 | Taylor et al. |

OTHER PUBLICATIONS

Sullivan, Marvin R., Harris Corporation; "NASA Contractor Report 3558, Part 2," LSST (Hoop/Column) Maypole Antenna Development Program; Contract NAS1-15763; Jun. 1982; pp. 1-298.

SPACE ANTENNA HAVING EXTENDIBLE HOOP AND INTERCONNECTED CORDS DEFINING POLYGONS AND RELATED METHODS

GOVERNMENT LICENSE RIGHTS

This invention was made with government support under Government Contract No. 65EP-STRT as part of a subcontract from the Aviation and Missile Technology Consortium (AMTC) Initiative No. AMTC-09-08-026, which has been issued by Advanced Technology International on behalf of Assured Positioning, Navigation and Timing/Space Cross-Functional Team (APNT/Space CFT). The government may have certain rights in the invention.

FIELD OF THE INVENTION

The present invention relates to the field of antennas, and, more particularly, to space antennas having extendible hoops and related methods.

BACKGROUND OF THE INVENTION

Common space antenna configurations are radial rib reflectors or unfolding rib reflectors, which generally include a parabolic shaped flexible reflective layer connected to collapsible ribs that are movable between stored and deployed positions. Cords, wires, or guidelines may couple the flexible reflective layer to the reflector ribs and provide support and tension to the antenna. A technical shortcoming of this space antenna design is the increased package volume required when the antenna is in the stored position within a satellite, thus taking up valuable space.

To address these storage limitations on the satellite, a space antenna may be designed as a hoop reflector, where the reflective layer is attached to an extendible hoop. To shape the reflective layer into a parabolic surface, the extendible hoop usually has a thickness out of the plane of the hoop that is greater than the depth of the parabolic surface. It usually has a bending stiffness to prevent the guide wire or other cord attachments to the reflective layer from warping out of plane.

One common space antenna configured as a hoop reflector is a high compaction ratio (HCR) reflector formed as a center fed antenna that is highly compact using a basic hoop-column design. The cords that support the hoop are radially aligned to intersect at a single point inside the center mast formed as an extendible boom. This hoop antenna may have a torsional dynamic mode singularity that is only restrained by the non-linear motion of the radial cords. This may result in a low natural frequency that can only be improved by significantly increasing the tension in the radial cords. For example, as the satellite is repositioned and internal satellite components such as the gyroscope move within the satellite, vibrations are imparted to the satellite, which may affect the antenna's torsional stability.

Since the radial cord arrangements contribute little to the torsional stiffness in the nominal position, the stiffness is mainly derived from the large-displacement motion of the space antenna. This is similar to a pendulum having zero stiffness to side loads until it is displaced, which causes the support cord to rotate, and the mass to rise, and a restoration force to be generated. This resulting torsion mode in the hoop configured space antenna may cause unwanted effects in orbit, and the natural frequencies imparted to the space antenna are usually undesirable to customers and may impact antenna performance.

Some proposals to address these technical problems associated with hoop configured antenna designs have added balanced sets of long diagonal cords that may improve some torsional rigidity and torsional stiffness. Long diagonal cords, however, often create additional redundant load paths that may be unacceptable for operation of the antenna.

SUMMARY OF THE INVENTION

In general, a space antenna may comprise an extendible boom movable between stored and deployed positions. An extendible hoop may surround the extendible boom and may be movable between the stored and deployed positions. A front cord arrangement may be coupled to the extendible hoop and define a curved shape in the deployed position. A reflective layer may be carried by the front cord arrangement. A rear cord arrangement may be behind the front cord arrangement and may be coupled between the extendible hoop and the extendible boom. The rear cord arrangement may comprise a rear plurality of interconnected cords defining a plurality of rear polygons. A plurality of tie cords may extend between the front cord arrangement and the rear cord arrangement. A top cord arrangement may be above the reflective layer and coupled between the hoop and the extendible boom.

The plurality of rear polygons may comprise a plurality of rear triangles, for example. The plurality of rear polygons may define a plurality of rear non-radial paths between the extendible hoop and the extendible boom. The plurality of rear polygons may also define a plurality of spaced apart rear rings concentric with the extendible boom. The plurality of tie cords may be parallel to the extendible boom.

The front cord arrangement may comprise a front plurality of interconnected cords defining a plurality of front polygons. The plurality of front polygons may comprise a plurality of front triangles. The plurality of front polygons may define a plurality of front non-radial paths between the extendible hoop and the extendible boom. The plurality of front polygons may also define a plurality of spaced apart front rings concentric with the extendible boom.

The top cord arrangement may comprise a top plurality of interconnected cords defining a plurality of top polygons, which may comprise a plurality of top triangles. The plurality of top polygons may define a plurality of top non-radial paths between the extendible hoop and the extendible boom. The plurality of top polygons may also define a plurality of spaced apart top rings concentric with the extendible boom. An antenna feed may be carried by the extendible boom.

Another aspect is directed to a method of making a space antenna. The method may comprise coupling a front cord arrangement to an extendible hoop to define a curved shape in a deployed position, coupling a reflective layer to the front cord arrangement, and coupling a rear cord arrangement behind the front cord arrangement and between the extendible hoop and an extendible boom within the extendible hoop. The rear cord arrangement may comprise a rear plurality of interconnected cords defining a plurality of rear polygons. The method may include coupling a plurality of tie cords between the front cord arrangement and the rear cord arrangement, and coupling a top cord arrangement above the reflective layer and between the extendible hoop and the extendible boom.

BRIEF DESCRIPTION OF THE DRAWINGS

Other objects, features and advantages of the present embodiments will become apparent from the detailed description which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime and double prime notation are used to indicate similar elements in different embodiments.

Figure 1:
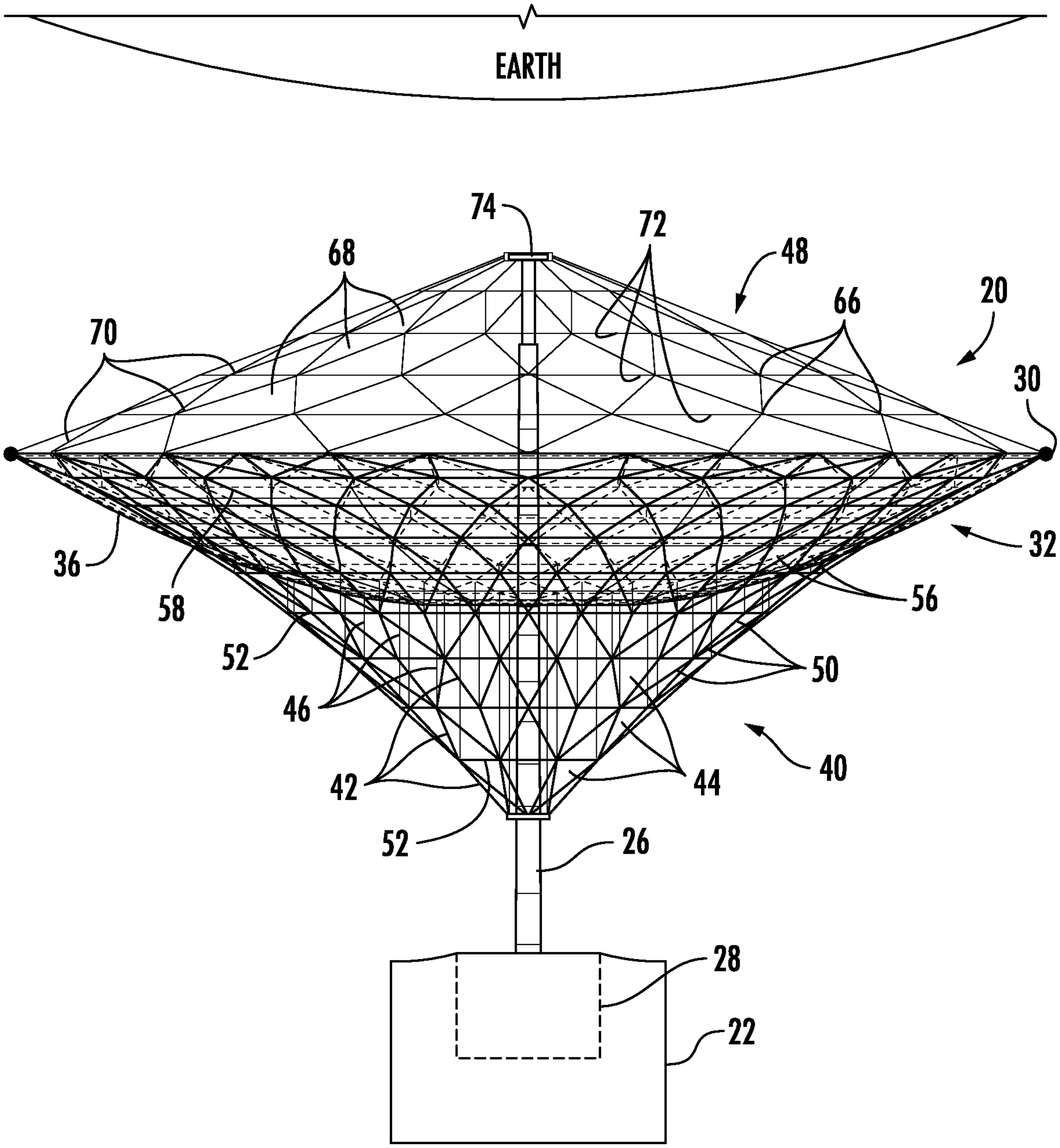
FIG. 1 is a side elevation view of the space antenna in a deployed position on a satellite.

Referring initially to FIG. 1, a space antenna is illustrated generally at 20 and mounted on a satellite 22 that is shown orbiting Earth (E), such as in a low Earth orbit (LEO) as typical for some small satellites. Other satellite orbit altitudes may be established depending on satellite functions and design, including mid-Earth orbit (MEO) and geostationary orbits. The space antenna 20 includes an extendible boom 26 that is movable between stored and deployed positions. In the stored position, the extendible boom 26 is received in this example within an antenna housing 28 of the satellite 22, but is extendible outward and vertically up into the extended position as shown in FIG. 1. An extendible hoop 30 surrounds the extendible boom 26 (FIG. 2) and is movable between the stored and deployed positions. The extendible boom 26 and extendible hoop 30 may be constructed similar to the structural configuration of the antenna formed as a scalable high compaction ratio (HCR) mesh hoop column deployable reflector system described in U.S. Pat. No. 9,608,333 issued Mar. 28, 2017, and assigned to Harris Corporation of Melbourne, Florida, the disclosure of which is hereby incorporated by reference in its entirety.

The satellite 22 may include other components not illustrated in detail, such as a solar or nuclear power system; an attitude control circuit; a gyroscope; a transceiver operative with the space antenna 20; a payload circuit that collects data from an installed camera, particle detector or other sensor; and a propulsion system to adjust trajectory.

Figure 2:
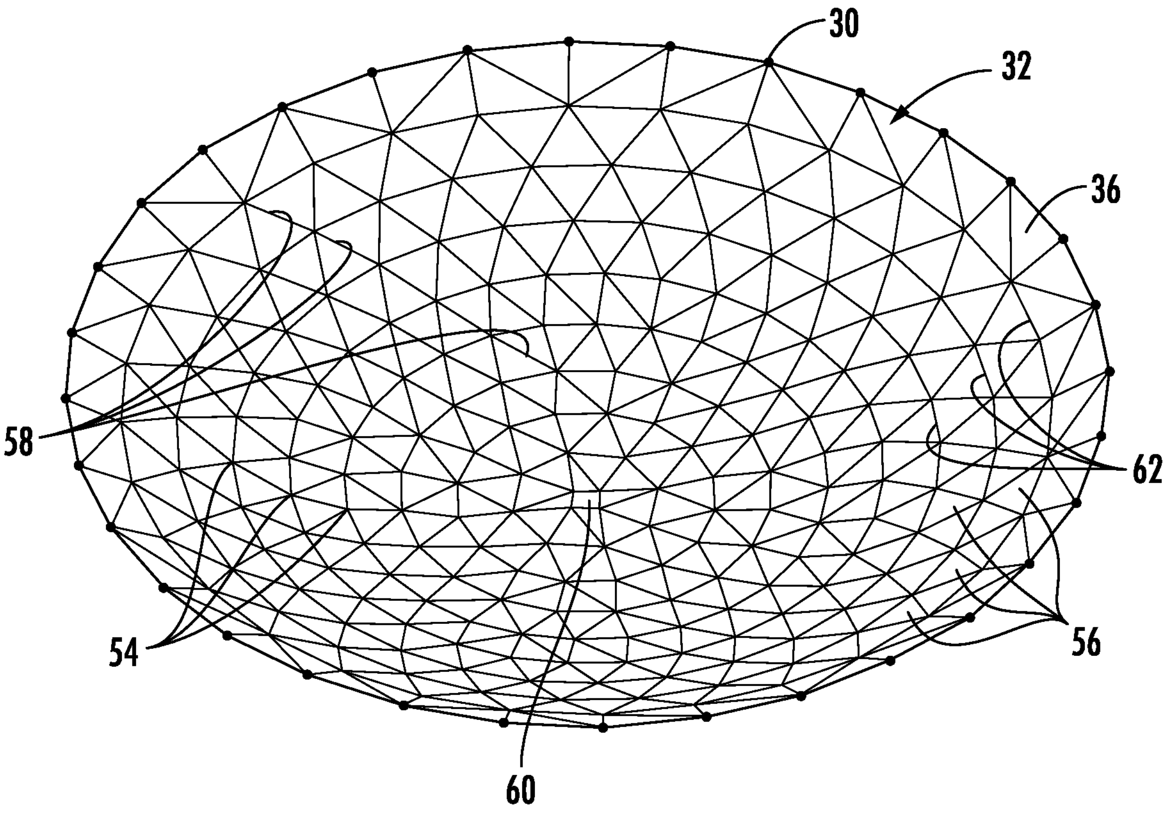
FIG. 2 is a fragmentary plan view of the front cord arrangement used in the space antenna of FIG. 1.

As illustrated, a front cord arrangement 32 is coupled to the extendible hoop 30 and defines a curved parabolic shape in the deployed position as shown in the partial view of the space antenna 20 of FIG. 2 that illustrates the front cord arrangement. A reflective layer 36 is carried by the front cord arrangement 32. A rear cord arrangement 40 is behind the front cord arrangement 32 and coupled between the extendible hoop 30 and the fixed base of the extendible boom 26 or antenna housing 28. The rear cord arrangement 40 includes a rear plurality of interconnected cords 42 that define a plurality of rear polygons 44. A plurality of tie cords 46 extend between the front cord arrangement 32 and the rear cord arrangement 40. A top cord arrangement 48 is above the reflective layer 36 and is coupled between the extendible hoop 30 and the extendible boom 26.

Figure 3:
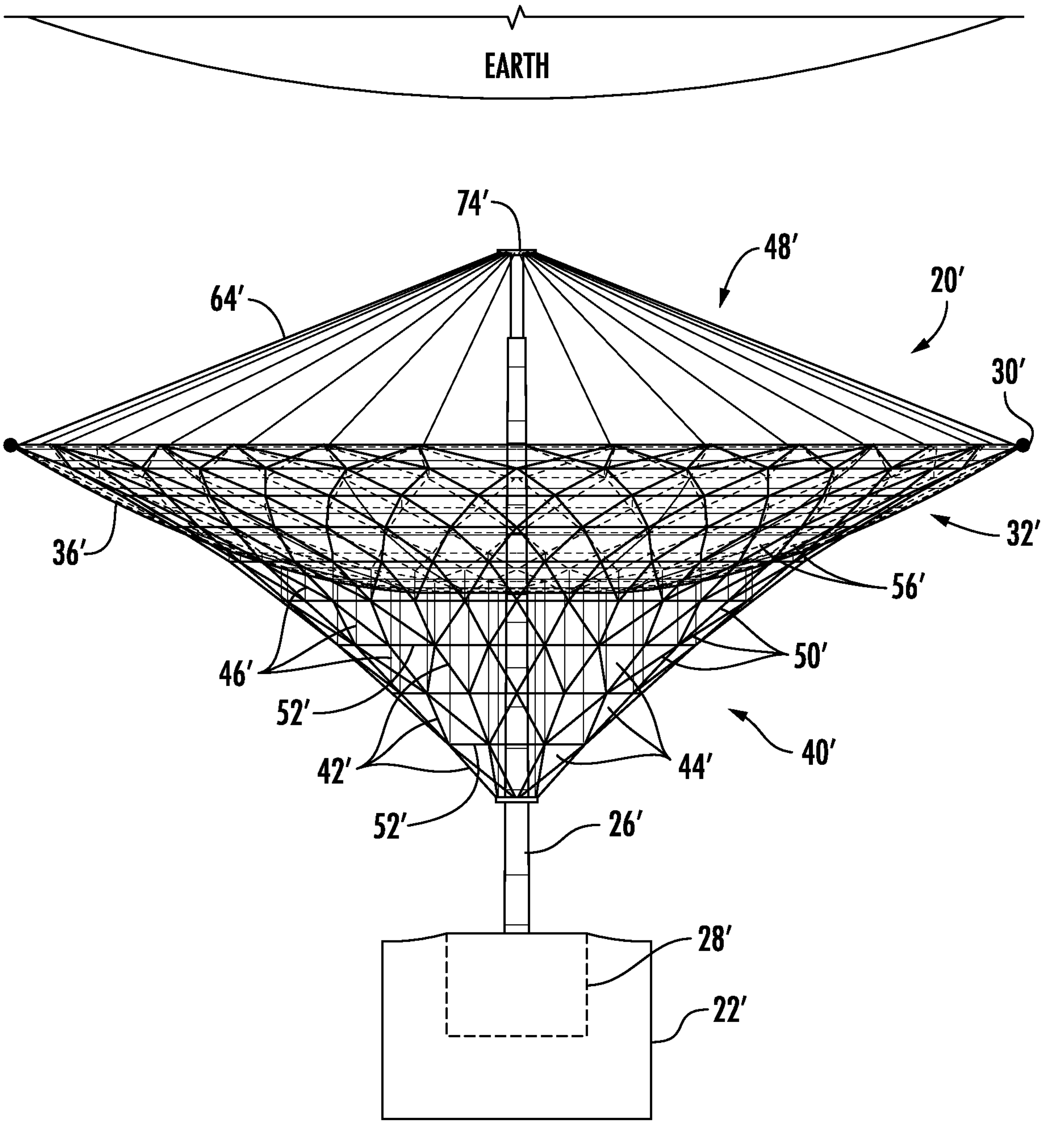
FIG. 3 is a side elevation view of another embodiment of the space antenna in a deployed position on a satellite.
Figure 4:
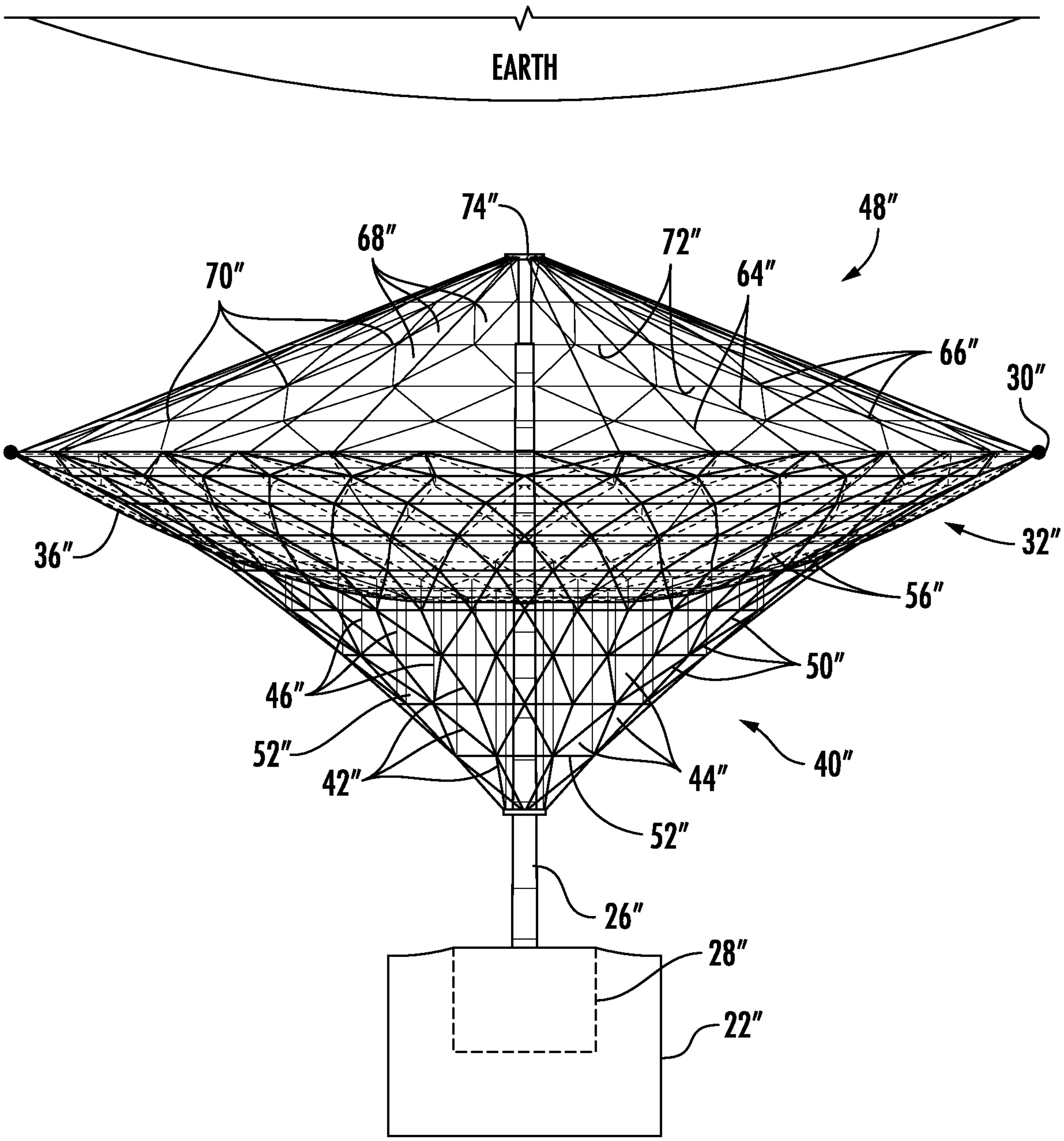
FIG. 4 is a side elevation view of yet another embodiment of the space antenna in a deployed position on a satellite.

In an example, the plurality of rear polygons 44 may be formed as a plurality of rear triangles as shown by the configuration of the rear polygons in FIGS. 1, 3 and 4. Although rear triangles 44 are illustrated, other shaped polygons, such as rhomboid configurations, may be employed. The rear polygons 44 may also define a plurality of rear non-radial paths between the extendible hoop 30 and the extendible boom 26 as shown by the non-linear path indicated at 50 (FIG. 1). The plurality of rear polygons 44 may also define a plurality of spaced apart rear rings 52 concentric with the extendible boom 26. The plurality of tie cords 46 may be parallel to the extendible boom 26 as shown in each of FIGS. 1, 3 and 4 to provide tension on the first cord arrangement 32 and aid in maintaining the parabolic shape of the reflective layer 36.

In an example, the front cord arrangement 32 as perhaps best shown in the plan view of FIG. 2 may be formed from a front plurality of interconnected cords 54 that define a plurality of front polygons 56. These front polygons 56 may include a plurality of front triangles. The plurality of front polygons 56 may also define a plurality of front non-radial paths 58 between the extendible hoop 30 and the extendible boom 26. A non-radial path 58 is evident by following a front polygon 56 from the outer ring as defined by the extendible hoop 30 along the path defined by front polygons. The front non-radial path 58 for contiguous front polygons 56 may extend between the extendible hoop 30 as the outer perimeter and the extendible boom 26 that is centered in and extends through the rectangular opening shown at 60. In an example, the front polygons 56 may also define a plurality of spaced apart front rings 62 concentric with the extendible boom.

In the example of the space antenna 20' of FIG. 3, the top cord arrangement 48' is illustrated as a plurality of top radial cords 64' that extend between the extendible hoop 30' and the top free end or tip of the extendible boom 26'. In the example of FIG. 1, however, the top radial cords 64 are removed since they may not provide as much torsional resistance, and instead, the top cord arrangement 48 includes a top plurality of interconnected cords 66 that define a plurality of top polygons 68, such as a plurality of top triangles. The plurality of top polygons 68 also may define a plurality of top non-radial paths 70 between the extendible hoop 30 and the extendible boom 26. The plurality of top polygons 68 may also define a plurality of spaced apart top rings 72 concentric with the extendible boom 30. In the example of FIG. 4, however, the top radial cords 64" are also included in the structure of the top cord arrangement 48", which includes the top plurality of interconnected cords 66" that define the plurality of top polygons 68". An antenna feed 74" may be carried by the extendible boom 26" at its top free end or tip.

Referring again to the example of FIG. 2 showing the plan view of the front cord arrangement 32, the front polygons 56 may be smaller near the center and increase in area and size outward from the center defined by the rectangular opening 60 towards the extendible hoop 30. In this example of the front cord arrangement 32, there are four points defining the rectangular opening 60 at the center followed by an 8-point front ring 62, two 16-point front rings, and followed by successive 32-point front rings outward to the extendible hoop 30 that has 32 points and defined by the larger area of the front polygons 56 than the area of the front polygons at the center. For example, at the center where the extendible boom 26 extends through the rectangular opening 60, there are still the front polygons 56 formed as triangles, but having a smaller area. This changing area of the front polygons 56 also applies to the configuration and arrangement of the rear polygons 44 and the configuration and arrangement of the top polygons 68.

Although triangles have been described as the polygon shape that may be formed at the rear cord arrangement 40, the front cord arrangement 32, and the top cord arrangement 48, other polygon shapes may be formed such as diamonds, rhomboids or other shapes that help eliminate the radial cord networks as commonly used with previous hoop antenna structures, forming what some skilled in the art may refer to as a modified isogrid configuration, which in an example are structural elements that run at different angles, such as 0°, 60° and 120° as non-limiting examples, and divide a plane into a series of triangles. The use of front, rear, and top polygons 56,44,48 having an arrangement each of non-radial paths 58,50,70 may appear to be less efficient in design because the polygons run at angles instead of forming radial cords that extend directly from the extendible hoop 30 to the extendible boom 26. The use of the front, rear, and top polygons 56,44,48, however, are highly efficient at carrying loads in a planar configuration, and therefore, allow an efficient load path for both the axial forces and the twisting forces imparted by torsion in the high compaction ratio hoop antenna design.

The front, rear, and top cord arrangements 32,40,48 may also be modified to reduce the number of front, rear, and top polygons 56,44,68 such as the formed triangles as the polygon pattern is propagated towards the extendible boom 26. This polygon configuration prevents a large number of the cords from converging at the extendible boom 26 and allows the pattern defined by the front, rear, and top cord arrangements 56,40,68 to concentrate the loads into the best available support locations.

In an example, the torsion mode of the space antenna 20 using the polygon structure as described may be increased from roughly 0.27 Hertz to 1.5 Hertz because the frequency is proportional to the square root of stiffness, representing a roughly 30-fold increase in torsional stiffness. Radial cord networks that were common in previous designs for a hoop antenna are substituted with at least the rear cord arrangement 40 having the rear plurality of interconnected cords 42 defining the plurality of rear polygons 44. The front cord arrangement 32 and top cord arrangement 48 also may include a structure having front and top polygons 56,58 to add the torsional stiffness to the overall structure of the space antenna 20. The plurality of tie cords 46 are parallel to the extendible boom 26 and form vertical ties that connect the front cord arrangement 32 to the rear cord arrangement 40 at the same polar coordinates in an example, and not only help maintain torsional stiffness, but also help maintain the parabolic shape of the reflective layer 36.

The space antenna 20 as described is an improvement over the more conventional hoop antenna designs that include radial cords that converge at a virtual point in the center of an extendible boom formed as the mast. Deleting those radial cords and substituting them with at least a rear cord arrangement 40 with its rear polygons 44 and also optionally the front cord arrangement 32 and top cord arrangement 48 and their front and top polygons 56,68 creates different load paths for the cords. This turns the different front, rear, and top cord arrangements 32,40,48 into a truss formation and permits their mathematical analysis using a simple linear finite element method (FEM) function, where the front, rear, and top polygons 56,44,68 may be discretized in spaced dimensions to predict the different vibration modes. The different front, rear, and top cord arrangements 32,40,48 may be tensioned enough such that any vibration imparted to the space antenna 20 does not create slack.

The number of front, rear, and top polygons 56,44,68 such as the triangles shown in FIGS. 1-4, for example, are reduced as the pattern is propagated toward the extendible boom 26 forming the mast. Those fewer cords near the extendible boom 26, especially as part of the rear cord arrangement 40, may be important to the overall stiffness of the space antenna 20. In that case, using larger cords for higher modulus cords in the center portion near the extendible boom 26 may increase stiffness without including more mass in other sections of the space antenna 20. The use of different front, rear, and top polygons 56,44,68 formed in a triangular pattern of polygons reduces the number of cords at any lower base plate used in the space antenna 20 so that machining and bonding of the different support structures is facilitated.

In another example, the cords forming the top cord arrangement 48 may be attached to different hoop hinges forming the extendible hoop 30 to allow the hinges to go "over-center" more easily. Arch cords as used in previous hoop antenna designs may be eliminated with the space antenna 20 due to a lower cord density in the center near the extendible boom 26. As noted before, the top cord arrangement 48 may be formed as radial cords to simplify the antenna structure. It is possible that only the rear cord arrangement 40 may be formed with its rear plurality of interconnected cords 42 to define a plurality of rear polygons 44 such as rear triangles, while the front cord arrangement 32 may include radial cords. However, greater torsional stiffness may be achieved when all three of the front, rear, and top cord arrangements 32,40,48 include the interconnected cords formed as polygons.

Figure 5:
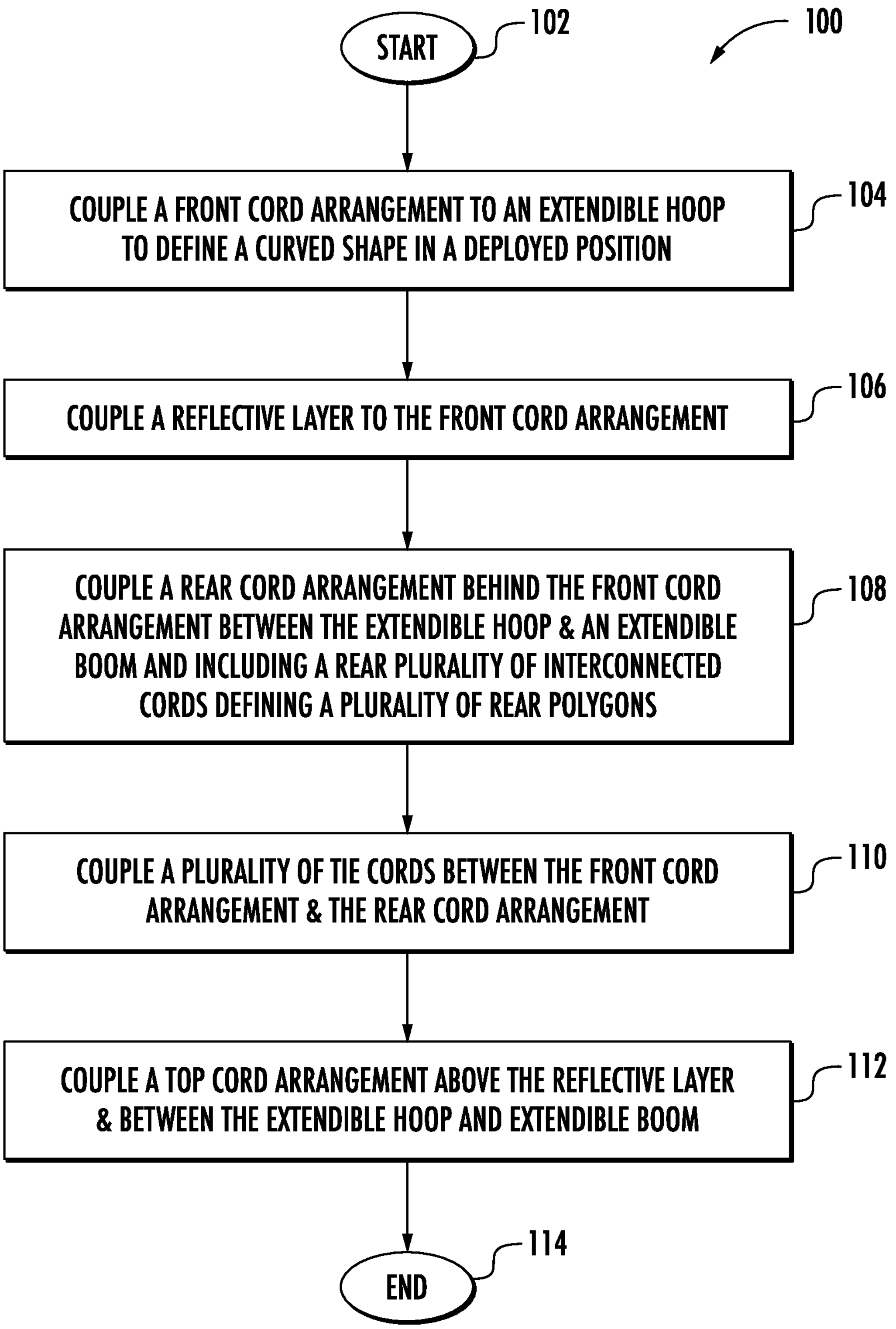
FIG. 5 is a high-level flowchart of a method for making the space antenna.

Referring now to FIG. 5, a high-level flowchart of a method of making the space antenna 20 is illustrated as shown generally at 100. The process starts (Block 102) and a front cord arrangement boom 32 is coupled to an extendible hoop 30 to define a curved shape in a deployed position (Block 104). A reflective layer 36 is coupled to the front cord arrangement 32 (Block 106). A rear cord arrangement 40 is coupled behind the front cord arrangement 32 between the extendible hoop 30 and an extendible boom 26 within the extendible hoop. It includes a rear plurality of interconnected cords 42 that define a plurality of rear polygons 44 (Block 108). A plurality of tie cords 46 are coupled between the front cord arrangement 32 and the rear cord arrangement 40 (Block 110). A top cord arrangement 48 is coupled above the reflective layer 36 and between the extendible hoop 26 and extendible boom 26 (Block 112). The process ends (Block 114).

It is possible to use a mold to aid in forming the space antenna 20, where the different cords may be tensioned with weights or springs, and the mold is integrated onto the extendible hoop 30. Grooves could be formed in the mold to maintain in position the different cords forming the rear cord arrangement 40, the front cord arrangement 32, and top cord arrangement 48. The use of this type of mold may reduce the number of operations when building the space antenna 20 and integrate the bonding of different cord arrangements in a single step. It is also possible to build the front cord arrangement 32 and rear cord arrangement 40 on a 3D tool.

The space antenna 20 may be formed in a variety of different dimensions, but in an example, may include a 1 to 5 meter aperture, and be stowed within an antenna housing 28 as part of the satellite 22. The space antenna 20 may vary in size depending on the size of the space antenna. For example, when the space antenna 20 has a one (1) meter aperture, the extendible hoop 30, and the different front, rear and top cord arrangements 32,40,38 may be stored in a 10 centimeter by 10 centimeter by 20 centimeter antenna housing 28, while a space antenna having a 3 meter antenna aperture, on the other hand, may be stowed in a 12 U cube that is a 20 centimeters by 20 centimeters by 30 centimeters antenna housing.

The antenna feed 74 as noted before is provided in this example at the top or free end of the extendible boom 26 that forms the mast. The extendible hoop 30 may be formed from different hinge members and link members, such as described in the incorporated by reference U.S. Pat. No. 9,608,333 patent. The link members may be formed from lightweight, high strength materials, for example, carbon fiber. The extendible hoop 30 may be biased outward when the space antenna is deployed using motor or spring driven gears or other spring mechanisms.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A space antenna comprising:
- an extendible boom movable between stored and deployed positions;
- an extendible hoop surrounding the extendible boom and movable between the stored and deployed positions;
- a front cord arrangement coupled to the extendible hoop and defining a curved shape in the deployed position;
- a reflective layer carried by the front cord arrangement;
- a rear cord arrangement behind the front cord arrangement and coupled between the extendible hoop and the extendible boom, the rear cord arrangement comprising a rear plurality of interconnected cords defining a plurality of rear polygons;
- a plurality of tie cords extending between the front cord arrangement and the rear cord arrangement; and
- a top cord arrangement above the reflective layer and coupled between the hoop and the extendible boom.

2. The space antenna of claim 1 wherein the plurality of rear polygons comprises a plurality of rear triangles.

3. The space antenna of claim 1 wherein the plurality of rear polygons define a plurality of rear non-radial paths between the extendible hoop and the extendible boom.

4. The space antenna of claim 1 wherein the plurality of rear polygons define a plurality of spaced apart rear rings concentric with the extendible boom.

5. The space antenna of claim 1 wherein the plurality of tie cords are parallel to the extendible boom.

6. The space antenna of claim 1 wherein the front cord arrangement comprises a front plurality of interconnected cords defining a plurality of front polygons.

7. The space antenna of claim 6 wherein the plurality of front polygons comprises a plurality of front triangles.

8. The space antenna of claim 6 wherein the plurality of front polygons define a plurality of front non-radial paths between the extendible hoop and the extendible boom.

9. The space antenna of claim 6 wherein the plurality of front polygons define a plurality of spaced apart front rings concentric with the extendible boom.

10. The space antenna of claim 1 wherein the top cord arrangement comprises a top plurality of interconnected cords defining a plurality of top polygons.

11. The space antenna of claim 10 wherein the plurality of top polygons comprises a plurality of top triangles.

12. The space antenna of claim 10 wherein the plurality of top polygons define a plurality of top non-radial paths between the extendible hoop and the extendible boom.

13. The space antenna of claim 10 wherein the plurality of top polygons define a plurality of spaced apart top rings concentric with the extendible boom.

14. The space antenna of claim 1 comprising an antenna feed carried by the extendible boom.

15. A space antenna comprising:
- an extendible boom movable between stored and deployed positions;
- an extendible hoop surrounding the extendible boom and movable between the stored and deployed positions;
- a front cord arrangement coupled to the extendible hoop and defining a curved shape in the deployed position;
- a reflective layer carried by the front cord arrangement;
- a rear cord arrangement behind the front cord arrangement and coupled between the extendible hoop and the extendible boom, the rear cord arrangement comprising a rear plurality of interconnected cords defining a plurality of rear triangles;
- a plurality of tie cords extending between the front cord arrangement and the rear cord arrangement, the plurality of tie cords being parallel to the extendible boom; and
- a top cord arrangement above the reflective layer and coupled between the hoop and the extendible boom.

16. The space antenna of claim 15 wherein the plurality of rear triangles define a plurality of rear non-radial paths between the extendible hoop and the extendible boom.

17. The space antenna of claim 15 wherein the plurality of rear triangles define a plurality of spaced apart rear rings concentric with the extendible boom.

18. The space antenna of claim 15 wherein the front cord arrangement comprises a front plurality of interconnected cords defining a plurality of front triangles.

19. The space antenna of claim 18 wherein the plurality of front triangles define a plurality of front non-radial paths between the extendible hoop and the extendible boom.

20. The space antenna of claim 18 wherein the plurality of front triangles define a plurality of spaced apart front rings concentric with the extendible boom.

21. The space antenna of claim 18 wherein the top cord arrangement comprises a top plurality of interconnected cords defining a plurality of top triangles.

22. The space antenna of claim 21 wherein the plurality of top triangles define a plurality of top non-radial paths between the extendible hoop and the extendible boom.

23. The space antenna of claim 21 wherein the plurality of top triangles define a plurality of spaced apart top rings concentric with the extendible boom.

24. The space antenna of claim 15 comprising an antenna feed carried by the extendible boom.

25. A method of making a space antenna comprising:
- coupling a front cord arrangement to an extendible hoop to define a curved shape in a deployed position;
- coupling a reflective layer to the front cord arrangement;
- coupling a rear cord arrangement behind the front cord arrangement and between the extendible hoop and an extendible boom within the extendible hoop, the rear cord arrangement comprising a rear plurality of interconnected cords defining a plurality of rear polygons;

coupling a plurality of tie cords between the front cord arrangement and the rear cord arrangement; and coupling a top cord arrangement above the reflective layer and between the extendible hoop and the extendible boom.

26. The method of claim 25 wherein the plurality of rear polygons comprises a plurality of rear triangles.

27. The method of claim 25 wherein the plurality of rear polygons define a plurality of rear non-radial paths between the extendible hoop and the extendible boom.

28. The method of claim 25 wherein the plurality of rear polygons define a plurality of spaced apart rear rings concentric with the extendible boom.

29. The method of claim 25 wherein the plurality of tie cords are parallel to the extendible boom.

30. The method of claim 25 wherein the front cord arrangement comprises a front plurality of interconnected cords defining a plurality of front polygons.

31. The method of claim 25 wherein the top cord arrangement comprises a top plurality of interconnected cords defining a plurality of top polygons.

* * * * *